Figure 1:
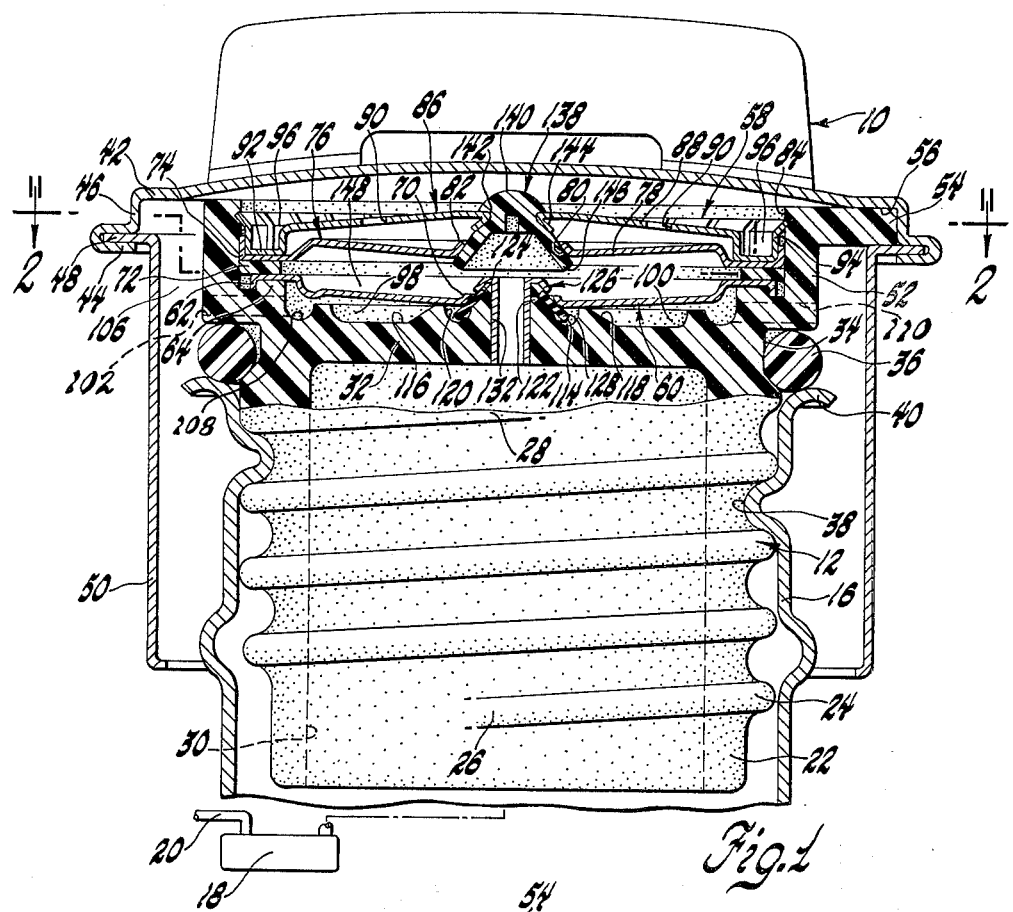

United States Patent [19]

Smith et al.

[11] 3,937,358

[45] Feb. 10, 1976

[54] PRESSURE VACUUM RELIEF VALVE ASSEMBLY

[75] Inventors: Claude A. Smith, Sandusky; Donald L. Williams, Port Clinton, both of Ohio

[73] Assignee: General Motors Corporation, Detroit, Mich.

[22] Filed: Sept. 9, 1974

[21] Appl. No.: 504,138

Related U.S. Application Data

[63] Continuation-in-part of Ser. No. 373,085, June 25, 1973, abandoned.

[52] U.S. Cl. ............................ 220/203; 220/303
[51] Int. Cl.² ................................. B65D 51/16
[58] Field of Search .......... 220/203, 303, 288, 210, 220/202; 137/493, 493.6, 493.7

[56] References Cited
UNITED STATES PATENTS

| | | | |
|---|---|---|---|
| 2,467,088 | 4/1949 | Konchan................................. | 220/303 |
| 2,613,012 | 10/1952 | Taylor et al. ........................... | 220/296 |
| 3,023,924 | 3/1962 | Boyer..................................... | 220/288 |
| 3,189,072 | 6/1965 | Starr ...................................... | 215/320 |
| 3,667,642 | 6/1972 | Blau et al............................... | 220/288 |
| 3,706,617 | 12/1972 | Stark et al. ............................ | 220/288 |
| 3,724,707 | 4/1973 | Burgess.................................. | 220/303 |
| 3,724,708 | 4/1973 | Burgess.................................. | 220/303 |
| 3,757,987 | 9/1973 | Marshall et al......................... | 220/203 |
| 3,809,282 | 5/1974 | Blau et al............................... | 220/288 |
| 3,858,751 | 1/1975 | Gendes................................... | 220/210 |

FOREIGN PATENTS OR APPLICATIONS

| | | | |
|---|---|---|---|
| 1,013,979 | 8/1957 | Germany ............................. | 220/203 |
| 1,153,277 | 8/1963 | Germany ............................. | 220/303 |

*Primary Examiner*—William Price
*Assistant Examiner*—Allan N. Shoap
*Attorney, Agent, or Firm*—J. C. Evans

[57] ABSTRACT

A pressure vacuum relief assembly for a container includes a housing with a first port in communication with the container and a second port in communication with atmosphere; the housing encloses improved vacuum and pressure relief valve means including first and second diaphragm members each having central openings therein engageable with conical surfaces on vacuum relief and pressure relief seal members; said first and second diaphragms form a control chamber in communication with the first port which is selectively pressurized to cause selective snap movement of each of the diaphragms to control flow across the seal members between atmosphere and the container.

5 Claims, 2 Drawing Figures

U.S. Patent   Feb. 10, 1976   3,937,358

PRESSURE VACUUM RELIEF VALVE ASSEMBLY

This is a continuation-in-part of U.S. Ser. No. 373,085 filed June 25, 1973 now abandoned.

This invention relates to vacuum and pressure relief valve assemblies for controlling pressure in a container and more particularly to valve assemblies to relieve pressure within the container upon a predetermined pressure build-up therein and means to communicate the container with atmosphere upon a predetermined vacuum condition occurring therein.

A container such as a fuel tank in an automotive fuel system can be vented to atmosphere by the simple expedient of a small pinhole in the tank cap to freely allow tank pressure to equalize with atmosphere. The requirement for evaporative emission control from automotive fuel systems, however, requires a semi-closed system with fuel vapors being routed to a carbon-filled cannister which alternately stores vapor when the engine is not operative and purges itself when the engine is running.

In such systems pressure and vacuum relief capabilities have been included in fuel filler caps or as an in-line valve assembly to produce vacuum relief upon the contingency of stoppage in the venting system and a pressure relief when there is a pressure build-up in the tank too rapid for the system to dissipate.

In prior caps with vacuum and pressure relief valves one approach suitable for its intended purpose includes relief valves utilizing spring loaded disks. Such disks have a fairly large diameter in order to be responsive to the low order of pressures or vacuums that must be relieved in systems of this type. The spring loaded sealing disks consequently have a large perimeter seal surface. Such a large perimeter seal surface, when coupled with a low seal force of the type present with the low order pressure conditions required for operation, will result in a reduced unit pressure at the actual seal surface contact area. Such valves are therefore subject to leakage if a blemish or mechanical imperfection is present on the sealing surface.

Also, when blow-off or vacuum relief pressure is attained, such disk design relief valve assemblies will raise only a slight distance from its seat to produce only a relatively small flow area. Pressure dissipation between atmosphere and the tank can be protracted because of the reduced flow area.

Furthermore, the valving components in such devices are relatively delicate and are susceptible to undesirable wear and performance upon exposure to dirt or other particulate foreign matter.

Accordingly, an object of the present invention is to improve vacuum and pressure relief devices for controlling pressure in systems having a container for liquid that evaporates by the provision therein of means for causing a significant opening of flow areas through the valve component of the device once a design blow-off pressure or design vacuum relief level has been attained thereby to provide a rapid pressure dissipation between atmosphere and a semiclosed fuel system.

Still another object of the present invention is to provide an improved pressure vacuum relief assembly wherein a snap action control of pressure and vacuum valves is attained by means of a pair of apertured spring diaphragm members arranged to form a control chamber therebetween in direct communication with a container for a liquid that evaporates wherein one or the other of the diaphragms will rapidly respond either to a predetermined vacuum condition within the container on liquid withdrawal therefrom or a predetermined pressure build-up produced by liquid evaporation therein to shift with respect to small diameter seal elements to rapidly open a large diameter area for flow of equalizing pressure between the container and atmosphere.

Still another object is to provide an arrangement like in the preceding object wherein the pair of spring diaphragm members are centrally apertured and are seated in a housing with each member having its periphery sealed by a gasket to form a pressurizable control chamber communicated with the container by a hollow member and wherein a valve seal element is located concentrically within each of central apertures of the spring diaphragm members to be engaged by each of the spring diaphragm members to maintain the pressurizable chamber sealed to atmosphere and wherein each of the diaphragms are responsive either to a vacuum or a pressure build-up within the control chamber to quickly snap away from the valve seal elements to produce a large flow area for pressure dissipation between atmosphere and the interior of the container and wherein each of the diaphragms quickly return to a sealed relationship with respect to the valve seal elements upon return of pressure to a predetermined level within the container to tightly close the container against leakage under such conditions.

Still another object of the present invention is to provide an improved vacuum and pressure relief valve assembly for sealing a semi-closed liquid-vapor system including a housing having a first apertured spring diaphragm supported therein to form a first pressure dissipation chamber in communication with atmosphere, a second apertured spring diaphragm having its outer periphery sealed with respect to the outer periphery of the first diaphragm to form a pressurizable control chamber therebetween, said assembly further including a second pressure dissipation chamber in communication with atmosphere on the opposite side of said diaphragms from said first pressure dissipation chamber and wherein a pair of spaced apart valve seal elements, each having a conical skirt portion thereon, are located concentrically within the apertured openings of the diaphragms so as to be engaged by an edge portion on each of the diaphragms to produce a high unit sealing pressure between said diaphragm and said sealing element and wherein a constant diameter sealing perimeter will be maintained between the seal element and the diaphragm; and wherein each of the diaphragms will snap open with respect to the seal element upon a predetermined pressure or vacuum condition within the control chamber to produce a large area flow for the dissipation of pressure to or from the semi-closed liquid vapor system and wherein the spring diaphragm will quickly return to its sealed position on the conical surface once a predetermined pressure condition is established in the semi-closed system.

Another object of the present invention is to provide an improved snap-acting valve having a thin disklike spring diaphragm with its outer periphery fixedly secured and with a central aperture that is moved by snap action with respect to a conical valve seal member mounted coaxially of the central aperture and the seal member having a flexible skirt which is sealingly engaged by the diaphragm aperture wall when the valve is closed and which is wiped clean by movement of the diaphragm aperture wall during valve opening and closing as produced by snap action of the diaphragm in response to pressure loads imposed thereon. These and other objects of the present invention are attained in one working embodiment that includes an outer housing. The housing includes support surfaces for receiving a pair of apertured spring diaphragms. A wall portion of the housing cooperates with one of the diaphragms to form a first pressure dissipation chamber having ports therein in communication with atmosphere, the wall includes a relief passage therethrough for directly communicating a control chamber between the diaphragms with the interior of a container for volatile liquid that evaporates. The wall carries a first conically configured seal member that is sealed by the first diaphragm at a central aperture therein until a predetermined vacuum occurs in the container as liquid is withdrawn therefrom. A second conical seal element is located within a central aperture in the second diaphragm to be sealed with respect thereto by an edge portion on the second diaphragm to seal the container until a maximum pressure occurs therein.

The housing and second diaphragm together form a second pressure equalization chamber in communication with atmosphere.

In operation, the seal elements are normally sealed by the diaphragms. When a predetermined vacuum condition occurs in the container that might cause the container to collapse, or when the system is over-pressured, a pressure condition occurs in the control chamber that will cause one or the other of the diaphragms to quickly open to present a large flow area for dissipation of pressure from atmosphere through the control chamber and relief passage into the system. Once pressure is equalized, the control chamber pressure will be such that both of the diaphragms will be in a sealed relationship with respect to the valve seal elements.

Further objects and advantages of the present invention will be apparent from the following description, reference being had to the accompanying drawings wherein a preferred embodiment of the present invention is clearly shown.

IN THE DRAWINGS

Figure 2:
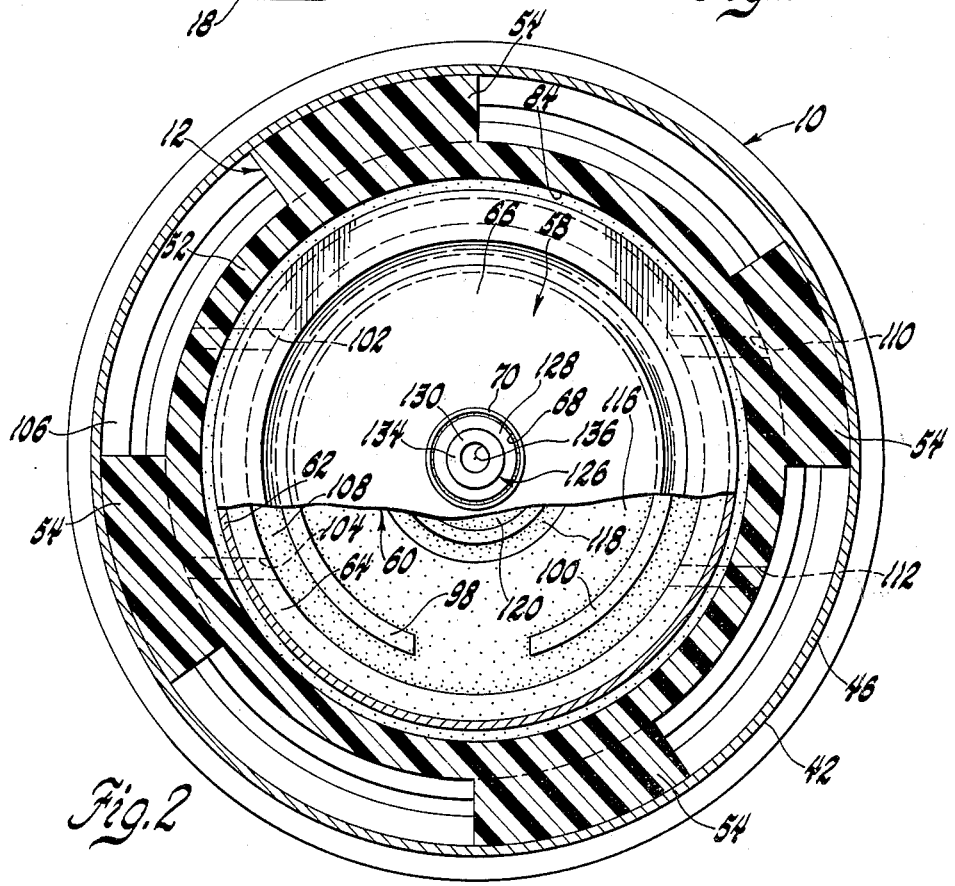

FIG. 1 is a view in vertical section of a pressure vacuum relief valve assembly; and FIG. 2 is a view in horizontal section taken along the lines 2—2 of FIG. 1 looking in the direction of the arrows.

Referring now to the drawings, in FIG. 1 a fuel cap 10 is illustrated. It includes a plastic closure 12 preferably made of Delrin 500, an aceytal resin made by DuPont Company, or Valox 310, a polyester resin made by General Electric Company.

The closure 12 is associated with a fuel filler neck 16. The neck 16 defines a fuel opening into a fuel tank or container 18 of a semi-closed fuel supply system with known evaporative emission controls. A fuel suction pipe 20 communicates with container 18 to remove fuel therefrom.

The closure 12 includes a depending, tubular skirt portion 22 having a helical thread 24 formed on the outer periphery thereof. The thread 24 is formed to provide four threads per inch with three full turns of the thread being a minimum. The start 26 and the end 28 of the thread evolve smoothly from root to crest of the thread within one quarter turns.

The skirt has a large diameter internal bore 30 directed therethrough opened at the bottom of the skirt 22 and closed at the top thereof by a wall portion thereon in the form of an upper partition wall 32 on the closure 12 formed transversely of the shell skirt 22.

The closure 12 includes a peripheral groove 34 therein radially outwardly of the partition wall 32. An O-ring seal 36 is supportingly received within the groove 34.

As illustrated in FIG. 1, the closure 12 is threadably connected to an internal thread 38 in the filler neck 16. The thread is located below an outwardly flared upper edge 40 forming the open end of the neck 16. When the cap 10 is seated in a sealed relationship within the neck 16, the O-ring 36 is held in sealed engagement with the upper edge 40 to seal between the closure 12 and the neck 16.

In the illustrated arrangement, the cap 10 has a cover 42 with a radially inwardly turned edge 44 on an outer peripheral wall 46 that secures a radially outwardly directed flange 48 on the end of a depending skirt 50 to cover 42. Skirt 50 will enclose the upper end of the neck 16 when the cap assembly is in place thereon. An upper end flange 52 on closure 12 has radially outwardly directed tabs 54 at circumferentially spaced points thereon press fit between a shoulder 56 on wall 46 and flange 48 to fixedly secure cover 42 to closure 12.

The upper end flange 52 of the closure 12 cooperates with the cover 42 and the partition wall 32 to enclose an improved pressure vacuum control valve assembly 58 constructed in accordance with the present invention.

The cap 10 and assembly 58 are utilized to prevent the escape of vapors from the filler neck 16 and tank or container 18 under normal pressure conditions in a semiclosed evaporative emission control system of the type well known to those skilled in the art. In such systems, vent lines are provided from a fuel tank that might be blocked. In such cases, further withdrawal of fuel from the fuel tank can cause a vacuum condition to occur therein that might eventually produce collapse of the fuel tank. Likewise, blockage of the vent system and subsequent thermal expansion and evaporation of fuel in the system sealed at the filler neck by means of the O-ring 36 can lead to an over-pressure condition within the system.

Accordingly, the control valve assembly 58 includes means to relieve both excessive pressure build-up and vacuum conditions within a container of a semi-closed liquid-vapor system. The illustrated filler neck 16 and attached tank 18 are merely representative of a container having a liquid which will evaporate to produce over-pressurization and which when withdrawn will produce a vacuum within the container, and whose pressure can be controlled by the improved valve assembly 58.

The valve assembly 58 more particularly includes a first apertured, spring diaphragm 60 that includes an outer peripheral edge 62 thereon bent over an internal flange in the form of an annular ridge 64 formed integrally on the closure 12 radially inwardly of the end flange 52 thereon.

The spring diaphragm 60 has a downwardly concave, dished center 66 with a center opening 68 therein formed by an upwardly curved edge 70 on the diaphragm 60.

The upper surface of the outer peripheral edge 62 is engaged by one face of an annular rubber gasket 72 having the other face thereof in sealed engagement with the underside of the outer periphery 74 of an apertured spring diaphragm 76. The spring diaphragm 76 includes a downwardly concave dished center 78 with a central opening 80 therethrough formed by an upwardly curved edge portion 82 therearound.

In the illustrated arrangement, the peripheral edges 62, 74 of the diaphragms 60, 76 are held in place within a large diameter bore 84 on the upper end of the closure 12 by means of a retainer plate 86 having an upwardly curved cover 88 overlying the upper surface of the spring diaphragm 76 in spaced relationship thereto. Openings 90 are formed in plate cover 88. The cover 88 is connected to a reversely bent annular peripheral wall 92 on the retainer plate 86 that engages the stacked diaphragms and gasket 72. An upstanding flange 94 on peripheral wall 92 has a plurality of slotted tabs 96 formed therein that are upset to interlockingly engage the walls of the bore 84 so as to securely fasten the diaphragms 60, 76 with respect to the closure 12.

The partition wall 32 includes a pair of spaced apart semi-circular baffle ridges 98, 100. The baffle 98 is interposed between a pair of vacuum relief ports 102, 104 formed through the flange 52 and the ridge 64 to communicate an atmospheric space 106 between closure 12 and filler neck 16 with an annular semi-circular groove 108 formed in the upper surface of the partition wall 32 radially inwardly of the ridge 64. Like relief ports 110, 112 are formed in the shell opposite to ports 102, 104 to perform the same function. The ports are all formed on chord lines of a circle formed by the outer periphery of flange 52 and thus direct flow away from the center of wall 32. This directional control, along with baffle ridges 98, 100 prevent dust and dirt impingement on the seal surface of a valve element 114.

The baffle 98 separates the vacuum relief ports 102, 104 from an annular depression 116 that has a radially inwardly, upwardly sloped wall portion 118 thereon that forms an annular opening 120 and baffle 100 likewise separates ports 110, 112 from depression 116.

The annular opening 120 surrounds an integral pedestal 122 on the partition wall 32 that supportingly receives a central apex 124 of an apertured vacuum valve seal element 126. The valve seal element 126 includes a downwardly, radially outwardly flared skirt 128 in the form of a truncated cone arranged 45° with respect to a vertical axis through the element 126. A vent eyelet 130 is located within a central bore 132 through the wall 32. It includes an upper head portion 134 thereon secured to the apex 124 of the seal element 126 for securing it in place on the upper surface of the wall 32.

As shown in FIG. 1, when the system is sealed and has a pressure therein within predetermined high and low limits, the upwardly curved edge 70 on the diaphragm 60 is located against the upper surface of the conical seal surface of skirt 128. It forms a sealing perimeter of reduced diameter so as to maintain a desired unit sealing pressure for sealing communication between the annular depression 116 and the interior bore 30 of the skirt 22 through a relief passage 136 through the eyelet 130.

In addition to the vacuum relief valve action between the vacuum diaphragm 60 and the vacuum seal element 126, the valve assembly 58 has a high pressure relief capability.

A pressure relief valve seal element 138 has a spherical apex portion 140 thereon fit through a reduced diameter central opening 142 in the retainer plate 86. A radially outwardly and downwardly flared edge 144 around the opening 142 overlies the upper surface of a conically shaped, outwardly flared skirt 146 on the seal element 138 formed as a truncated cone, 45° to the vertical axis of element 138.

Under normal pressure conditions, the upper surface of the conically shaped skirt 146 is engaged by the upwardly turned edge 82 of the apertured pressure spring diaphragm 76.

The turned edge 82 of diaphragm 76 and turned edge 70 of diaphragm 60 will wipe against the upper surface of seal element 138 and seal element 124, respectively, to produce a positive seal surface therebetween of reduced diameter to maintain a high unit sealing pressure.

Furthermore, the conical configuration of the skirts 128, 146 will maintain a constant sealing diameter even though the length of the skirt grows under operating conditions.

By virtue of the aforedescribed arrangement, the vacuum seal element 126 and pressure seal element 138 will cooperate with the spring diaphragms 60 and 76 to define a normally closed pressure control chamber 148 therebetween that is in direct communication with the interior of the semi-closed fuel system via the eyelet relief passage 136.

In one working embodiment the primary component parts of assembly 10 had the following mechanical and physical characteristics and specifications.

| Component | Specification |
| --- | --- |
| Closure 12 | Delrin 500 - aceytal resin |
| | Valox 310 - polyester resin |
| Thread 24 | 1.790" O.D. |
| | 1.570" root diameter |
| Cover 42 | Zinc plated steel |
| | Thickness .025" |
| Cover wall 46 | 2.65" I.D. |
| Vacuum diaphragm 60 | Anodized aluminum .006" thick; |
| | 1.750" O.D. |
| Spring dish 66 | 1.250" O.D. |
| Pressure diaphragm 76 | Anodized Aluminum .006" thick |
| | 1.786" O.D. |
| Spring dish 78 | 1.250" O.D. |
| Retainer 86 | Zinc plated steel .010" thick |
| Pressure seal element 138 | Fluorocarbon elastomer - Shore "A" 60–70 hardness |
| Vacuum seal element 126 | Fluorocarbon elastomer - Shore "A" 60–70 hardness |

In one working embodiment the vacuum relief mode of operation occurs when a minus 15 to minus 25 inches of $H_2O$ exists in the semi-closed system defined in part by the filler neck 16. This reduced pressure directed into the control chamber 148 through the passage 136 causes the pressure diaphragm 76 to remain closed against pressure seal 138. Atmospheric pressure through bleed ports 102, 104, 110, 112 on the underside of the vacuum diaphragm 60 causes it to quickly snap into an open position thereby to present a large flow area annulus between the upwardly turned edge 70 of the diaphragm 60 and the conical surface of skirt 128 on the vacuum seal element 126 so that atmospheric pressure quickly passes from the underside of the diaphragm 60 into the control chamber 148 thence through the passage 136 to relieve the vacuum condition in the tank.

The pressure relief mode of operation occurs when the tank pressure exceeds plus 25 to plus 35 inches of $H_2O$. Under these conditions, the pressure in the control chamber 148 causes the diaphragm 60 to be biased downwardly into closed relationship with the vacuum seal element 126. However, the pressure within the control chamber 148 causes the pressure diaphragm 76 to snap upwardly against atmospheric pressure on the upper surface thereof to quickly present a large flow area between the upwardly turned edge 82 and the conical surface of skirt 146 whereby the excessive pressure within the system dissipates through passage 136, control chamber 148 thence through the annular flow area of the valve 138 and through the relief holes 90 in the retainer plate 86 from whence the flow is passed through the dome space between the cover 42 and the flange 52 to atmosphere.

By virtue of the configuration of the diaphragms 60, 76 the pressure vacuum valve 58 will quickly relieve both vacuum and pressure and will provide a large flow area for quick dissipation of pressure in either direction. Furthermore, the configuration of the diaphragm and seal elements maintain the system positively sealed so long as the pressure therein is within the vacuum and pressure relief limits set forth above, which are representatively set forth values especially suited for fuel supply systems, other values applying to other applications.

The perimeter of the seal contact between diaphragm and seal elements is such that a high unit pressure seal is maintained when the semi-closed system is sealed. Furthermore, the 45° conical surface configuration of the seal elements will compensate for growth along the conical surfaces of the seal element thereby maintaining a relatively constant seal diameter between diaphragm and seal element. There is a rubbing action between the upwardly turned ends of the diaphragm and the seals to produce a self-cleaning action between the sealing components and the assembly. As illustrated in order to provide for the self-compensation of growth, the seal elements must be supported at their apex as for example at the spherical head 140 of the pressure seal element 138 and at the apex 124 of the vacuum sealing element 126.

While the embodiment of the present invention, as herein disclosed, constitutes a preferred form, it is to be understood that other forms might be adopted.

What is claimed is as follows:

1. A pressure-vacuum relief valve assembly for a semi-closed liquid vapor system having a container for liquid which evaporates to build-up pressure in the container to a positive value and which can be withdrawn from the container to reduce the pressure therein to a negative value comprising a housing having an outer flange thereon and a wall portion thereon formed transversely of said outer flange, said housing further including an internal flange located radially inwardly of the outer flange in spaced relationship therewith, a first apertured spring diaphragm having an outer periphery thereon supported by said internal flange, said first diaphragm and wall portion defining a vacuum relief chamber, passage means in said housing communicating said vacuum relief chamber with atmosphere, a second apertured spring diaphragm having a peripheral portion thereon supported in sealing relationship with the outer periphery of said first diaphragm and being spaced with respect to said first diaphragm to form a pressurizable control chamber therebetween, passage means for directly communicating the interior of said pressurizable control chamber with the interior of a container, a vacuum relief seal member on said wall portion interposed within said first apertured diaphragm to control flow from said vacuum relief chamber through the passage means between said pressurizable control chamber and said container for vacuum relief at a predetermined negative pressure range, a pressure relief seal member interposed within said second apertured diaphragm between said control chamber and atmosphere, said second diaphragm operative in response to a predetermined build-up of pressure within said control chamber to open communication between the interior of said housing and atmosphere thereby to relieve a predetermined positive pressure range within the control chamber.

2. A pressure-vacuum relief valve assembly for a semi-closed liquid vapor system having a container for liquid which evaporates to build-up pressure in the container to a positive value and which can be withdrawn from the container to reduce the pressure therein to a negative value comprising a housing having a peripheral wall defining a housing bore, a partition wall in said housing formed transversely of said peripheral wall at one end of said bore, a cover on said housing overlying the opposite end of said bore, a plurality of ports formed through said peripheral wall to define vacuum relief passages in communication with atmosphere, each of said ports being located on a chord line through the circumference of the peripheral wall, an internal baffle ridge on said housing within said peripheral wall intersecting each of said ports and forming a curvilinear surface for separating particulates from vacuum relief air flow into said housing bore, vacuum relief valve means within said housing bore between said partition wall and said cover including an opening in said partition wall for communicating said vacuum relief ports with a container upon a predetermined vacuum condition occurring within the container to relieve the container against vacuum collapse, pressure relief port means including a space between said cover and said housing bore, and pressure relief valve means interposed between said partition wall opening and said cover responsive to a predetermined pressure build-up within said container to cause relief of pressure build-up therein through said pressure relief port means to prevent a build-up of excessive pressure within the container.

3. A pressure-vacuum relief valve assembly comprising a housing member having relief passage means therein adapted to be in communication with pressure within a container, a first spring diaphragm having a peripheral portion thereon sealingly connected to said housing and forming therewith a vacuum relief chamber, port means in said housing communicating said vacuum relief chamber with atmosphere, a second spring diaphragm having an outer periphery, means sealingly connecting the outer periphery of said second diaphragm to the periphery of said first diaphragm to form a variable pressure control chamber therebetween, said relief passage means being in direct communication with said pressurizable chamber for varying the pressure therein in accordance with pressure conditions within the container, a vacuum valve seal element in said relief passage means including a conical surface thereon, a central opening in said first spring diaphragm including an annular edge portion thereon engageable with said conical surface to form a normally closed seal therebetween, said first spring diaphragm being movable upon a predetermined minimum pressure within said pressurizable control chamber to cause said first diaphragm to shift so as to open communication between said vacuum relief chamber and said pressurizable control chamber thereby to communicate atmosphere with the container through said relief passage means, a pressure relief valve seal element having a conical skirt thereon located axially of said vacuum relief valve element in spaced relationship thereto, said second diaphragm including a central opening therein in communication with atmosphere having a raised annular edge therearound, said annular edge of said second spring diaphragm being normally engaged with said pressure seal conical skirt to seal thereagainst when normal pressure conditions exist within the container, said second spring diaphragm responding to a predetermined increase in pressure within the container to move so as to locate the second diaphragm edge in spaced relationship to said pressure seal element skirt thereby to exhaust pressure from the container through said relief passage means, said pressurizable control chamber and said second diaphragm opening to atmosphere.

4. A pressure-vacuum relief valve assembly for a semi-closed liquid vapor system having a container for liquid which evaporates to build-up pressure in the container to a positive value and which can be withdrawn from the container to reduce the pressure therein to a negative value comprising a housing having an outer flange thereon and a wall portion thereon formed transversely of said outer flange, said housing further including an internal flange located radially inwardly of the outer flange in spaced relationship therewith, a first spring diaphragm having an outer periphery thereon supported by said internal flange, said first diaphragm having a central opening therethrough, an annular gasket member supportingly received on the outer periphery of said first diaphragm, a second diaphragm member having a periphery thereon in sealing engagement with said gasket, a retainer member having the outer periphery thereof in engagement with the outer periphery of said second diaphragm and including a portion thereof in interlocking engagement with said outer flange to secure said first and second diaphragms in sealing engagement with said gasket, said transverse wall portion having a central opening therethrough in communication with a container, a pressure seal member having an apex portion thereon secured centrally of said retainer and including a downwardly depending conical skirt thereon defining a first valve seat, said second diaphragm including an annular edge formed centrally thereof engageable with said conical skirt to form a pressure relief valve, a vent member directed through the central opening in said transverse wall portion, a vacuum seal member having an apex portion thereon secured to said vent member and including a downwardly depending conical skirt thereon defining a second valve seat, an annular edge formed centrally of said first diaphragm engageable with said vacuum seal member skirt to form a vacuum relief valve, said transverse wall portion and said first diaphragm cooperating to form a vacuum relief space, said first and second diaphragms cooperating to form a control pressure chamber for operating said second diaphragm between opened and closed positions, means forming a pressure relief passage from said housing in communication with atmosphere, said housing including a plurality of passages therein located on chord lines through the circumference of said outer flange to communicate said vacuum relief space with atmosphere, said first and second diaphragms responding to a predetermined pressure increase within the container to cause said first diaphragm to seal against said vacuum seal member and to cause said second diaphragm to move away from said pressure seal member to communicate the vent member with atmosphere during a pressure relief mode of operation, said first and second diaphragms responding to a predetermined reduction in pressure within the container to reduce the pressure in the control pressure chamber between said first and second diaphragms so as to cause said second diaphragm to be held by atmospheric pressure against said pressure seal member and to cause said first diaphragm to move from said vacuum seal member to communicate atmosphere with the space between said diaphragms thence through said vent member into the container.

5. A valve closure for sealing between a first source of pressure and a second source of pressure comprising a valve housing having a bore therethrough, a spring diaphragm having an outer periphery fixedly secured to said housing, a dished center portion on said diaphragm separating said housing into first and second pressure chambers, wall means on said diaphragm including a turned edge forming a central aperture therein to define a flow passage between said first and second chambers, a seal element having a flexible skirt of conical configuration, means for supporting said skirt coaxially of said central aperture for engagement with said wall means to seal said central aperture against flow therethrough, said diaphragm being responsive to a predetermined pressure differential between said first and second chambers to cause said wall means to snap axially of said skirt to produce an annular open flow area between said aperture and said skirt, said diaphragm being responsive to a reversal of pressure differential between said first and second chambers to close said turned edge against said skirt in an action wherein said turned edge wipes the surface of said skirt.

* * * * *